Oct. 8, 1929.  H. W. A. LEHNERT  1,730,579
VALVE HANDLE
Filed April 9, 1927
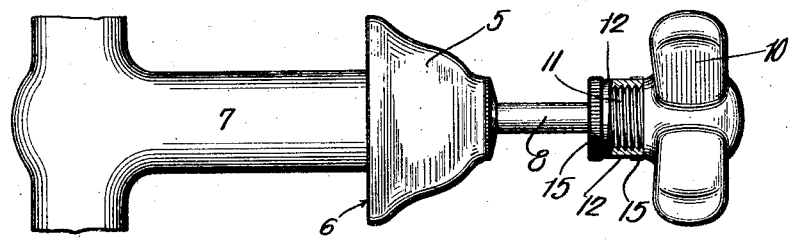
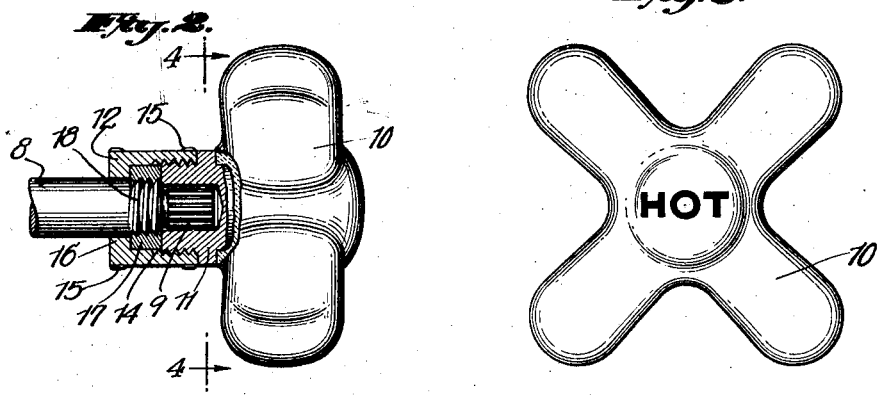
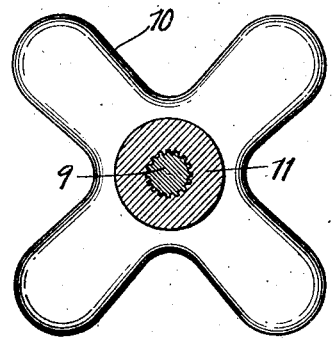

Patented Oct. 8, 1929

1,730,579

UNITED STATES PATENT OFFICE

HENRY W. A. LEHNERT, OF NEW YORK, N. Y.

VALVE HANDLE

Application filed April 9, 1927. Serial No. 182,197.

This invention relates to plumbing.

The subject of the invention is a new and improved mounting and adjusting appliance for a faucet handle, particularly of the type carrying visibly in service the word "Hot" or "Cold" or a similar legend.

In plumbing appliances of a heretofore favored type, the faucet handle has had to be mounted in place on the valve stem, in the usual operating location, and secured on the stem in that location, in order to set the valve to fully or tightly closed condition; and then the handle has had to be released from its securement and properly reset on the stem if, as has usually been the case, the described setting of the valve to closed condition has resulted in throwing the legend out of its intended alignment, usually horizontal. Also, later resettings of the handle on the stem have been from time to time required, to restore the legend on the handle to its proper alignment, as the valve member or valve seat or washer or some other working part became worn.

In this type of plumbing appliance of the prior art, the socket of the handle usually carries circumferentially spaced longitudinal ribs, and then the end of the valve-stem to be received in such socket carries similar ribs; the ribs in the socket being shaped to fit within the spaces between the ribs on the stem, and vice versa, so that the handle may be loosely slipped on and off the stem, and when placed on the latter is positively keyed thereon. The handle-socket, also, is usually provided with a radial, threaded passage for mounting a set-screw, this screw to be tightened to bite into the stem to lock the handle and stem rigidly together. The tightening and loosening of this screw is awkward and troublesome.

An object of the invention is to provide an appliance of simple, sturdy, dependable and inexpensive construction, and at the same time one wherein the screw mentioned is eliminated, not only to make a more sightly arrangement, but also to the end of securing a resettable handle which may be quickly and easily reset.

Various other objects and advantages of the invention than those hereinabove mentioned will be specifically pointed out or will be apparent hereinafter in the course of the below detailed description of the form of the invention shown, in the accompanying drawing, as a preferred one of the various possible embodiments of the invention; it being understood, naturally, that such form is merely illustrative of one of the many possible combinations and arrangements of parts well calculated to attain the objects of the invention, and hence said detailed description of such form is not to be taken as at all defining or limiting the invention itself. That is to say, the scope of protection contemplated is of course to be taken from the appended claims, interpreted as broadly as is consistent with the prior art.

In the accompanying drawings:

Fig. 1 shows said form, in side elevation, part of the handle-socket being broken away and in section;

Fig. 2 is also a side elevation, partially broken away and partially in section, showing on an enlarged scale the handle-carrying end of the valve stem and the parts carried thereby;

Fig. 3 is an end elevation of Fig. 2, showing the face of the cruciform type of handle illustrated in the drawing; and Fig. 4 is a transverse section, taken on line 4—4 of Fig. 2.

Referring to the details of the form of the invention illustrated, the part 5 represents a familiar element which may be present to finish off the appliance at the line 6 where the water-supply pipe 7 enters the basin or the like (not shown) served by the faucet.

Within this pipe 7, and controlling a suitable valve therein in a manner well understood in the art, is a rotatable valve-stem 8.

As is familiar also in the art, this stem at its outer end is provided with a key-carrying portion 9, for feathering thereon, that is, for having easily slipped on and off the same, the socket portion of the faucet handle. Such a handle is indicated at 10; the socket thereof being marked 11. In the present case, said stem portion 9 exteriorly carries, and said socket 11 interiorly carries, the ribs hereinabove referred to, as clearly shown in Figs. 2 and 4.

In the form of the invention illustrated, however, there is mounted on the stem 8, in back of the portion 9 thereof, a rotatable collar or thimble 12. This collar is interiorly threaded as indicated at 14, and handle-socket 11 has exteriorly thereon a thread matching the thread in the collar.

To facilitate finger tightening or loosening of the collar 12, circumferential knurlings are preferably provided as indicated at 15.

Screwing up the collar 12 on the handle-socket 11 will jam or wedge lock the collar on the socket. In order at the same time similarly to lock the collar, and hence the handle-socket, on the stem, there are provided wedge elements for coacting incident to screwing up the collar on the socket, to lock together the collar, the stem, and the socket. These wedge elements are shown as annular or ring elements. One of such elements is here an inwardly directed annular flange 16 on the collar, and another is the annular face at the rear or free end of the socket 11. In the present case, this flange 16 is not arranged to abut directly against the rear annular face of the socket 11, but only indirectly; since, in the now preferred construction illustrated, there is mounted on the stem, at a length thereof in rear of the stem portion 9, a lesser collar 17, to be wedgedly interposed between the annular flange 16 of the collar 12 and the rear annular face of the socket 11 when the collar 12 is screwed upon the socket. Further, as a feature of the construction now preferred, and in order to insure always that the various elements 16, 14 and 11 will finally properly wedge together, on tightening up the collar 12, the lesser collar 17 is threadedly mounted on its appointed length of the stem 8, as indicated at 18, and these threads are of the opposite hand to the threads by which the collar 12 is screwed up on the handle-socket 11.

Thus, it will be clear that to reset the handle 10 on the stem 8, at any time, it is merely necessary to unscrew the collar 12 from the handle-socket 11, then slip the handle off the stem, and then, after properly angularly adjusting the handle relative to the stem, slip the handle back on the stem, and again screw up the collar 12 on the handle-socket. In first installing the appliance, that is, to mount the collar 12 and the lesser collar 17 on the stem, the collar 12 is first slipped onto the main cylindrical stem portion, and the lesser collar 17 is next mounted on the threaded portion 18 of the stem.

Inasmuch as many changes could be made in the above construction, and many apparently widely different embodiments of the invention could be made without departing from the scope thereof, it is intended that all matter contained in the above description or shown in the accompanying drawing shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. A faucet-handle mounting comprising a valve stem having near its outer end a screw-thread and extending therebeyond a splined end-portion of less diameter than the thread, a collar on the screw-thread, a handle having a hub with a splined socket receiving said stem-end-portion, and a flanged thimble about the collar, having its flange engaging the collar and also having screw-thread engagement with the handle hub, and retaining the hub-end against the collar.

2. A faucet-handle mounting comprising a valve stem having near its outer end a screw-thread and extending therebeyond a splined end-portion of less diameter than the thread, a collar on the screw-thread, a handle having a hub with a splined socket receiving said stem-end-portion, and a flanged thimble about the collar, having its flange engaging the collar and also having screw-thread engagement with the handle hub, and retaining the hub-end against the collar, the screw-threads of the stem and the bushing having opposite pitch-leads.

In testimony whereof I affix my signature.

HENRY W. A. LEHNERT.